(12) United States Patent
Asai

(10) Patent No.: US 10,760,701 B2
(45) Date of Patent: Sep. 1, 2020

(54) VALVE DEVICE WITH A LIQUID CONTACT PART THAT IS EASILY ATTACHED TO AND REMOVED FROM A VALVE DRIVE PART

(71) Applicant: TAKASAGO ELECTRIC, INC., Nagoya-shi, Aichi-ken (JP)

(72) Inventor: Naoya Asai, Nagoya (JP)

(73) Assignee: TAKASAGO ELECTRIC, INC., Aichi-ken (JP)

( * ) Notice: Subject to any disclaimer, the term of this patent is extended or adjusted under 35 U.S.C. 154(b) by 0 days.

(21) Appl. No.: 16/211,829

(22) Filed: Dec. 6, 2018

(65) Prior Publication Data

US 2019/0186650 A1 Jun. 20, 2019

(30) Foreign Application Priority Data

Dec. 14, 2017 (JP) .................................. 2017-239697

(51) Int. Cl.
*F16K 31/04* (2006.01)
*F16K 31/06* (2006.01)
*F16K 27/02* (2006.01)

(52) U.S. Cl.
CPC .......... *F16K 31/047* (2013.01); *F16K 27/029* (2013.01); *F16K 27/0236* (2013.01); *F16K 31/0672* (2013.01)

(58) Field of Classification Search
CPC .. F16K 31/047; F16K 27/029; F16K 27/0236; F16K 31/0672
USPC ........... 251/129.17, 331, 335.2, 367, 129.03, 251/129.02
See application file for complete search history.

(56) References Cited

U.S. PATENT DOCUMENTS

| 2,382,235 | A | * | 8/1945 | Lamar | ..................... | F16K 41/12 |
| | | | | | | 137/329.4 |
| 2,842,400 | A | * | 7/1958 | Booth | ..................... | F16K 31/06 |
| | | | | | | 239/569 |
| 3,812,398 | A | * | 5/1974 | Kozel | ................. | F16K 31/0655 |
| | | | | | | 251/331 |
| 4,597,412 | A | * | 7/1986 | Stark | ....................... | F16K 31/06 |
| | | | | | | 137/606 |
| 4,711,269 | A | * | 12/1987 | Sule | .................... | F16K 31/0634 |
| | | | | | | 137/625.5 |

(Continued)

FOREIGN PATENT DOCUMENTS

| JP | 2000-283044 A | 10/2000 |
| JP | 5175778 B2 | 4/2013 |

*Primary Examiner* — John Bastianelli
(74) *Attorney, Agent, or Firm* — Cheng Law Group, PLLC

(57) ABSTRACT

A valve device includes a liquid contact part having a valve part provided in a flow path to distribute a liquid, and a valve drive part that is removably joined to the liquid contact part and drives the valve part to open/close. In the valve part of the liquid contact part, a diaphragm valve is provided, and at a substantially central portion of the diaphragm valve, a valve stem is provided to project. The valve stem is inserted slidably in a stem hole opened and provided in a joint surface between the liquid contact part and the valve drive part. On joint surfaces between the liquid contact part and the valve drive part, fitting joint parts by which the liquid contact part and the valve drive part are positioned and removably fitted and joined to each other are provided.

6 Claims, 12 Drawing Sheets

(56) References Cited

U.S. PATENT DOCUMENTS

| | | | | |
|---|---|---|---|---|
| 5,002,086 A | * | 3/1991 | Linder | F16K 17/0453 137/312 |
| 5,361,802 A | * | 11/1994 | Kroll | F16K 27/003 137/552 |
| 5,546,987 A | * | 8/1996 | Sule | F16K 31/0658 137/625.5 |
| 5,758,864 A | * | 6/1998 | Asai | F16K 7/14 251/129.17 |
| 5,865,421 A | * | 2/1999 | Ono | C23C 16/4481 137/341 |
| 6,722,629 B1 | * | 4/2004 | Nakazawa | F16K 7/14 251/129.17 |
| 6,796,322 B2 | * | 9/2004 | Sen | F16K 31/0613 137/82 |
| 6,929,240 B2 | * | 8/2005 | Ueda | F16K 7/20 251/129.02 |
| 9,441,742 B2 | | 9/2016 | Muller et al. | |

\* cited by examiner

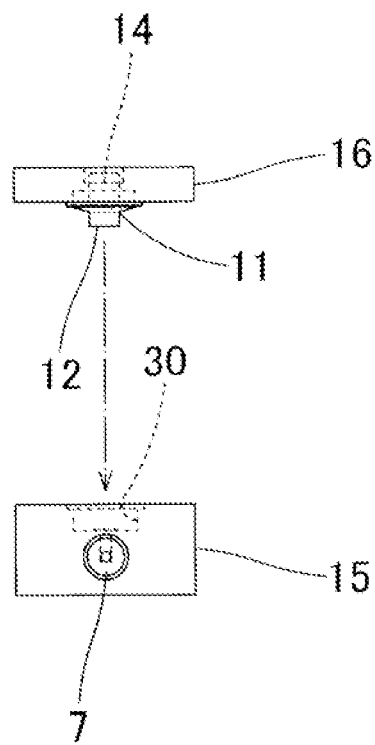

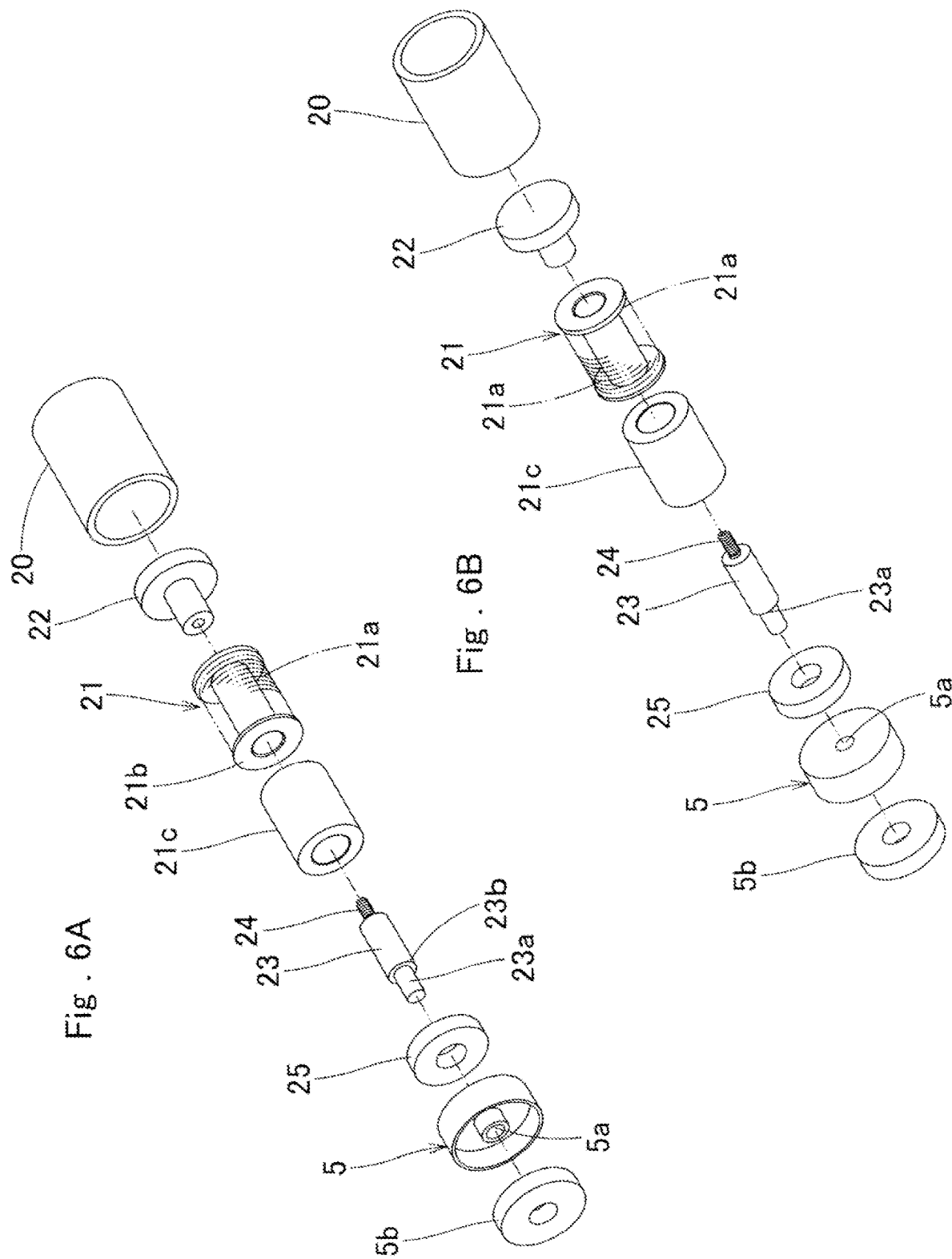

VALVE DEVICE WITH A LIQUID CONTACT PART THAT IS EASILY ATTACHED TO AND REMOVED FROM A VALVE DRIVE PART

BACKGROUND OF THE INVENTION

1. Field of the Invention

The present invention relates to a valve device including a liquid contact part having a diaphragm valve and a valve drive part that drives the diaphragm valve to open/close, and specifically, to a valve device in which a liquid contact part is easily attached to and removed from a valve drive part.

2. Description of Related Art

For example, in a device that supplies a trace amount of a fluid such as a chemical solution in a chemical analyzer and medical equipment, etc., a small-sized valve device is provided for a fluid to open and close the flow path. For the purpose of preventing contamination of a chemical solution, etc., a valve device of this type needs to be structured so that a liquid contact part is attachable to and removable from a valve drive part, and the liquid contact part can be cleaned or disposed of each time of use for analysis, etc.

Conventionally, as such a valve device that opens and closes a flow path through which a trace amount of a chemical solution is supplied, a liquid contact part replaceable type valve device is proposed in Japanese Patent No. 5175778.

This valve device is structured so that a flow path is formed inside a soft sheet-like liquid feeding unit, and inside a valve part of the flow path, a valve seat is movably located, and a diaphragm with a valving element is provided at an upper side of the valve seat, and further, a pressurization mechanism including a pressurization rod located above the diaphragm, is provided.

At the time of valve opening in this valve device, the pressurization mechanism is operated to press the pressurization rod onto the diaphragm, and the valving element is pressed down via the diaphragm to open the valve. When the liquid contact part is removed, the entire liquid feeding unit serving as a liquid contact part is removed, and the entire liquid feeding unit is replaced.

Further, the valve device described in patent Publication described above does not include a structure to removably attach a pressurization mechanism with a pressurization rod to a fixed position in the valve part in the liquid feeding unit.

Therefore, at the time of use, even if a user of the valve device can remove the entire liquid feeding unit, it is difficult to precisely and easily attach the pressurization rod of the pressurization mechanism to a fixed position in the valve part of the liquid feeding unit.

SUMMARY OF THE INVENTION

An object of the present invention is to provide a valve device in which a liquid contact part can be easily and precisely attached to and removed from a valve drive part. The object of the present invention can be achieved by a valve device configured as follows.

That is, a valve device according to the present invention includes a liquid contact part provided with a flow path to distribute a liquid, a valve part provided in the liquid contact part and configured to open and close the flow path, a valve drive part removably joined to the liquid contact part and configured to drive the valve part to open/close, a diaphragm valve provided in the valve part, a valve stem provided to project from a substantially central portion of the diaphragm valve, and a stem hole which is provided in the liquid contact part so as to open in a joint surface between the liquid contact part and the valve drive part, and through which the valve stem is inserted, wherein on joint surfaces between the liquid contact part and the valve drive part, fitting joint parts by which the liquid contact part and the valve drive part are positioned and removably fitted and joined.

According to the valve device of the present invention, a user can easily remove the liquid contact part from the valve drive part before or after use, and after cleaning or replacing the liquid contact part, can easily and precisely position and attach a dean liquid contact part to the valve drive part as preparation for reuse.

Here, the valve device described above is preferably configured so that the valve drive part is provided with a solenoid and a plunger configured to slide in the solenoid when activated, and an operation end provided on a tip end of the plunger comes into contact with an end portion of the valve stem and can enter the stem hole. With this configuration, when the liquid contact part and the valve drive part are fitted by the fitting joint parts, the operation end of the plunger of the valve drive part can be brought into precise contact with the valve stem on the liquid contact part side.

Here, the valve device described above can be configured so that, when the valve drive part is not activated, the diaphragm valve is closed by a biasing force of a spring provided on the plunger, and accordingly, the valve device can be configured as a normally close type valve device.

Here, the valve device described above can be configured so that a diaphragm of the diaphragm valve has valve-opening returnability to open the valve in a free state where no biasing force is applied to the diaphragm, and the diaphragm valve is brought into a valve open state while the valve drive part is removed from the liquid contact part. With this configuration, when cleaning of the liquid contact part is performed in a state where the liquid contact part is removed from the valve drive part, by draining a liquid pooling inside the liquid contact part and flowing cleaning water throughout a valve chamber from the flow path, the interior of the liquid contact part can be excellently cleaned.

Here, in the valve device described above, it is also possible that the diaphragm valve is provided with a spring member to bias the diaphragm valve to a valve opening side.

Here, it is preferable that the valve device described above is configured so that the fitting joint parts by which the liquid contact part and the valve drive part are fitted and joined to each other are provided with a fitting concave portion and a fitting convex portion to be fitted in the fitting concave portion, and at the time of fitting, the fitting concave portion and the fitting convex portion are attracted to each other by a magnet. With this configuration, the liquid contact part and the valve drive part can be easily joined to each other or separated from each other, and when they are joined, by mutual attraction by a magnet, an excellent joined state can be maintained.

Here, the valve device described above can be configured so that the magnet is provided inside the fitting joint part of the valve drive part, the fitting joint part of the liquid contact part is formed of a magnetic body, the fitting convex portion is formed on the fitting joint part of the liquid contact part, and the fitting concave portion is formed on the fitting joint part of the valve drive part.

According to the valve device of the present invention, the liquid contact part can be easily and precisely attached to and removed from the valve drive part.

BRIEF DESCRIPTION OF THE DRAWINGS

FIG. 5 is an exploded front view of the liquid contact part.

FIG. 6A is an exploded perspective view of the valve drive part, and FIG. 6B is an exploded perspective view of the valve drive part, viewed from an opposite direction.

DESCRIPTION OF THE PREFERRED EMBODIMENTS

Figure 1:
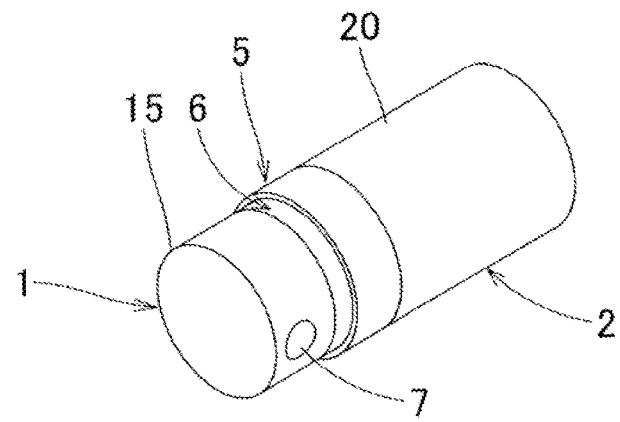
FIG. 1 is a perspective view of a valve device showing an embodiment of the present invention.

Hereinafter, the present invention is described based on embodiments shown in the drawings. The present invention is not limited to the embodiments. All modifications within requirements of the claims or equivalents regarding the requirements shall be included in the scope of the claims.

This device is a small-sized valve device to be used as a valve that opens and closes a flow path to supply a trace amount of a fluid such as a chemical solution, and is configured to include a liquid contact part 1 having a valve part 10 that opens and closes a flow path 18, and a valve drive part 2 that is joined to the liquid contact part 1, and drives the valve part 10 to open/close.

Figure 8:
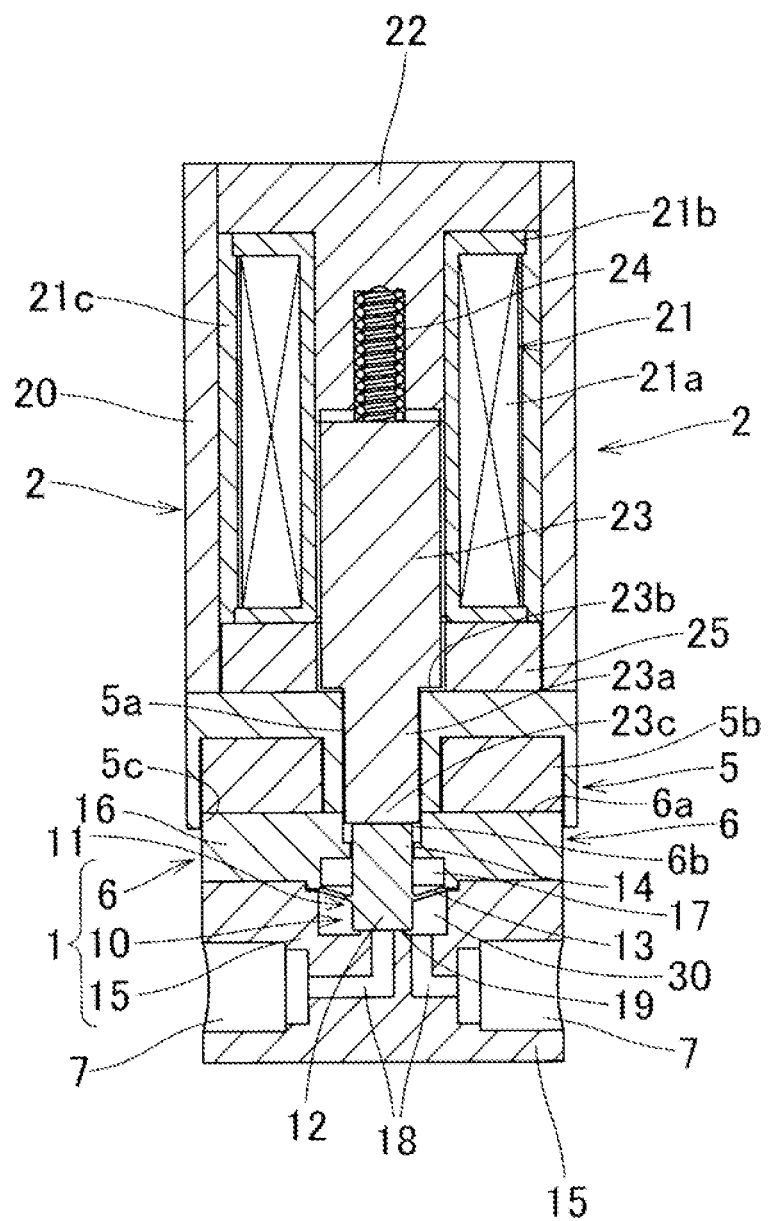
FIG. 8 is a longitudinal sectional view of the valve device.
Figure 9:
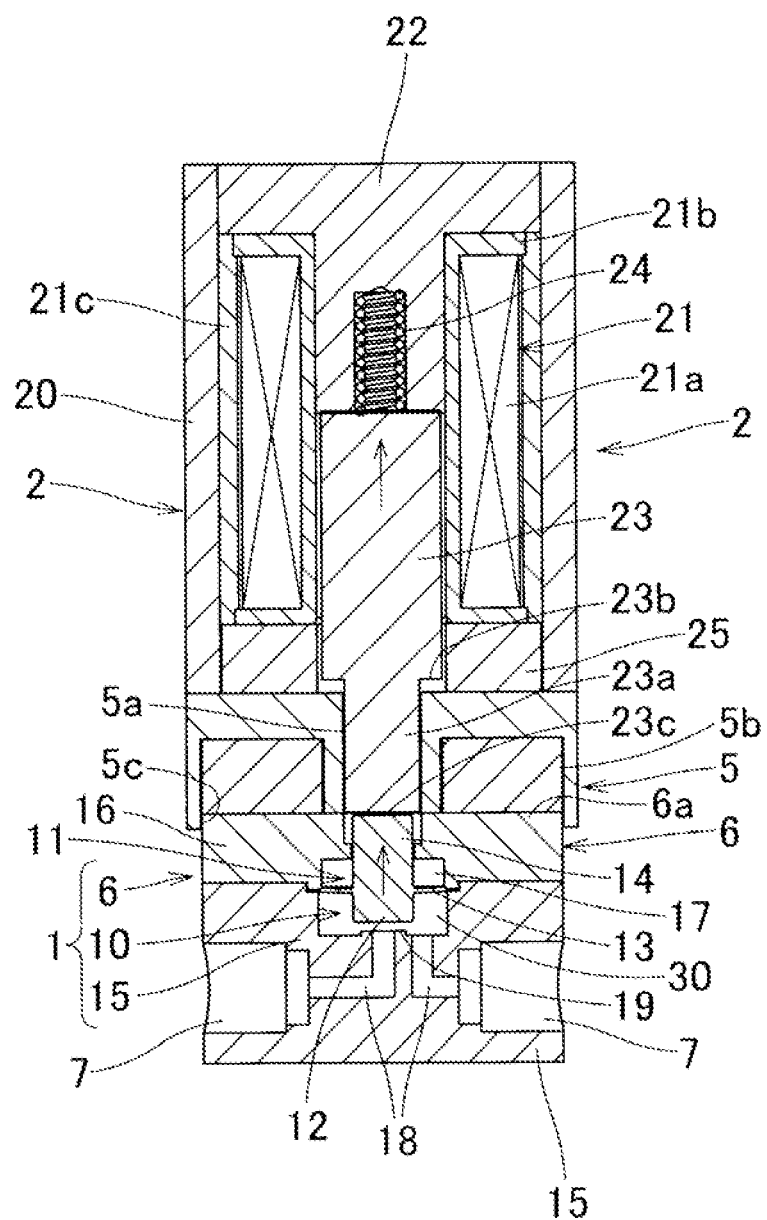
FIG. 9 is a longitudinal sectional view of the valve device when a solenoid is activated.

As shown in FIG. 6, the valve drive part 2 has a cylindrical case 20, and a solenoid 21 is housed inside the case 20. The solenoid 21 is configured by winding a coil 21a around a bobbin 21b and attaching a coil cover 21c to the outside of the coil, and fixed inside the case 20 by a holding part 22 on a terminal end side and an attaching part 25 on a front end side. Inside the solenoid 21, a plunger 23 is located slidably in an axial direction as shown in FIG. 8 and FIG. 9. At the holding part 22 side of the plunger 23, a narrow-diameter portion is provided, a coil spring 24 is fitted around the narrow-diameter portion, and the plunger 23 is biased to a projection side (downward in FIG. 8 and FIG. 9) by the coil spring 24.

On the other hand, as shown in FIG. 6, to the side of the case 20 opposite to the holding part 22, that is, on the projection side of the plunger 23, a fitting joint part 5 is attached so as to close the inside of the case 20, and at a central axis position of the fitting joint part 5, a central hole 5a is provided. On the projection tip end side of the plunger 23 (lower side in FIG. 8 and FIG. 9), a small-diameter portion 23a is provided via a stepped portion 23b. The small-diameter portion 23a of the plunger 23 is inserted through the central hole 5a of the fitting joint part 5, and an operation end 23c provided at a tip end portion of the plunger 23 slightly projects to the liquid contact part 1 side from the central hole 5a of the fitting joint part 5 when not energized as shown in FIG. 8.

As shown in FIG. 8, in a state where the solenoid 21 is turned off (not energized), the plunger 23 slides downward in FIG. 8 due to a biasing force of the coil spring 24, and the stepped portion 23b comes into contact with an upper surface of the fitting joint part 5 and the plunger stops. At a tip end (lower end) of the small-diameter portion 23a of the plunger 23, an operation end 23c that pushes a valve stem 14 down to close the valve is provided, and in a state where the solenoid 21 is turned off, the operation end 23c of the plunger 23 slightly projects to the liquid contact part 1 side from the fitting joint part 5 and enters an upper portion of a stem hole 17 as shown in FIG. 8 and FIG. 9.

Figure 2:
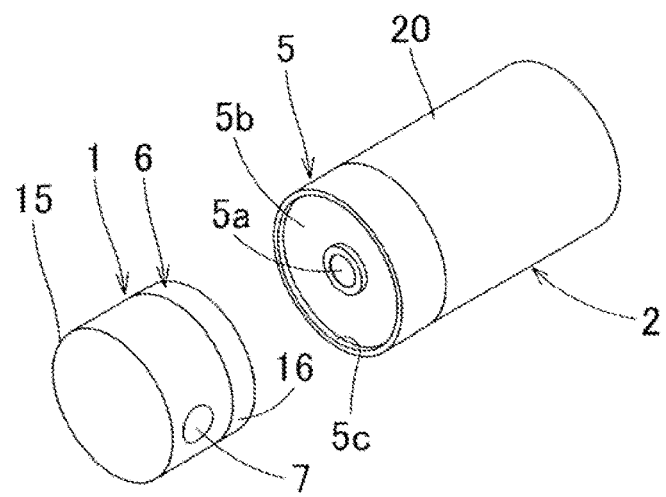
FIG. 2 is a perspective view showing a state where a liquid contact part and a valve drive part of the same valve device are separated.
Figure 3:
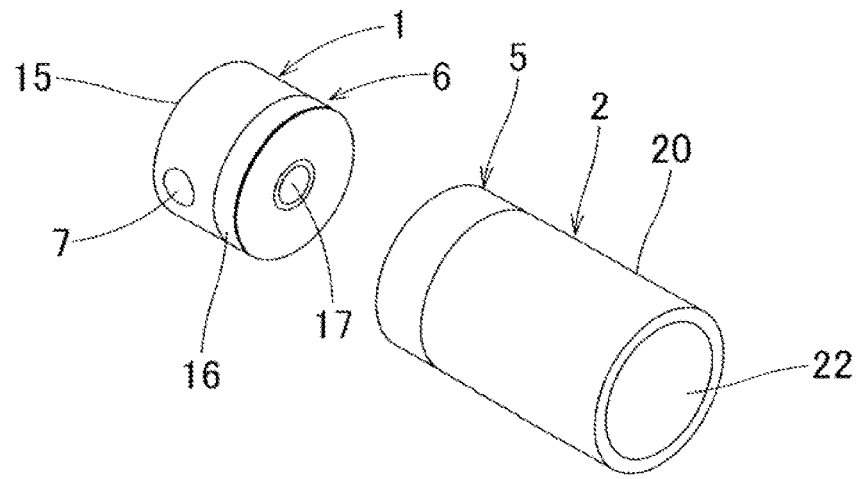
FIG. 3 is a perspective view showing the state where the liquid contact part and the valve drive part of the same valve device are separated, viewed from an opposite direction.
Figure 4:
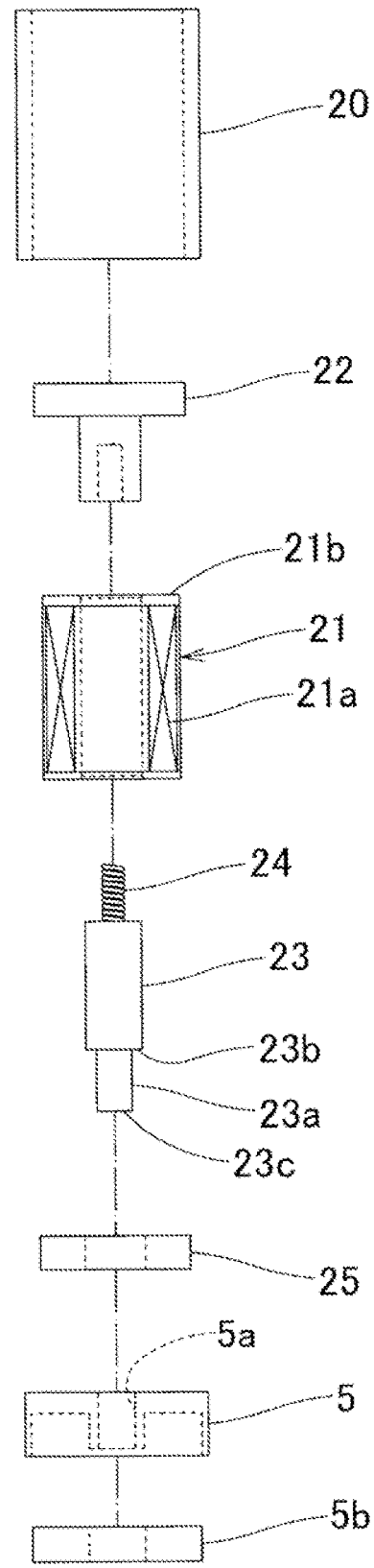
FIG. 4 is an exploded front view of the valve drive part.
Figure 10:
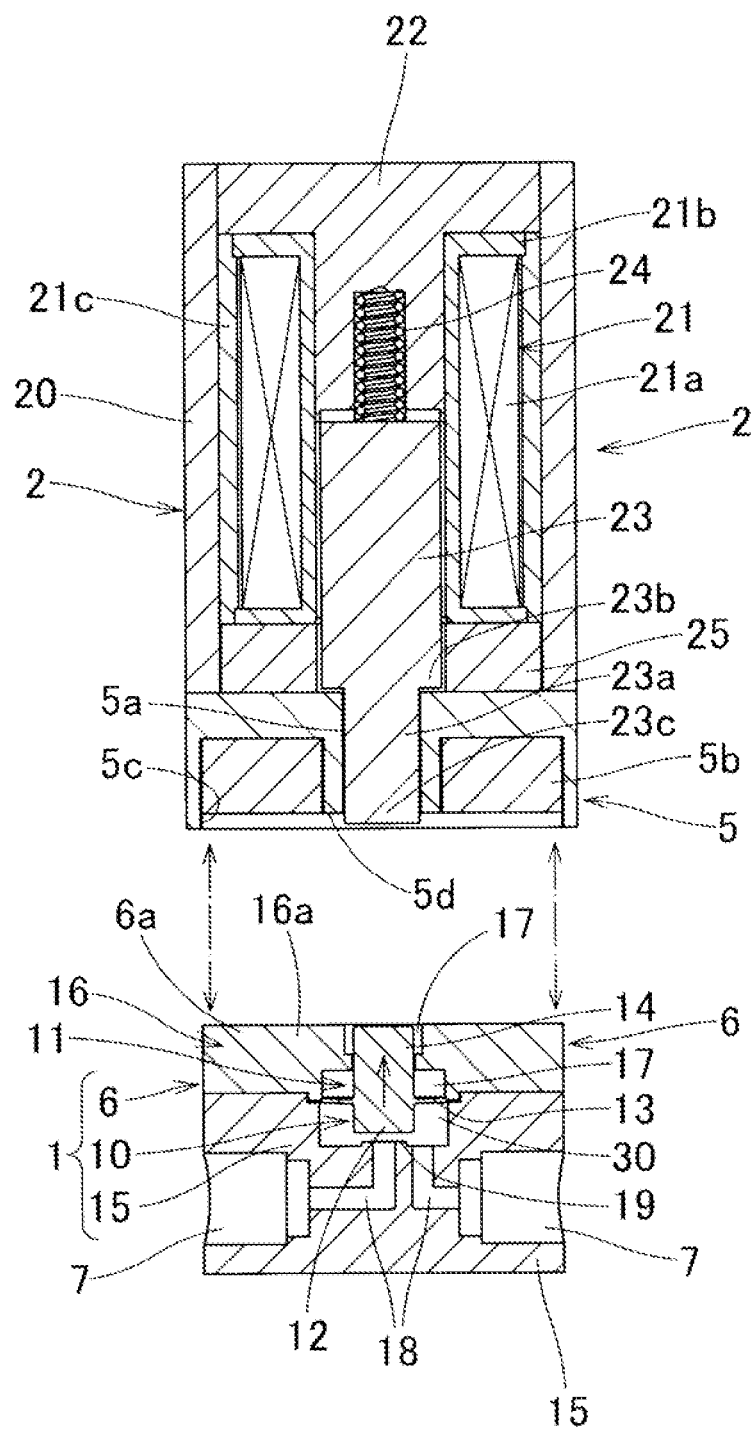
FIG. 10 is a longitudinal sectional view showing a state where the liquid contact part is separated.

Further, inside the fitting joint part 5 at a lower end of the valve drive part 2, an annular magnet 5b is attached toward the opposite side, that is, the liquid contact part 1 side. The ring-shaped magnet 5b is attached so as to surround the circumference of the central hole 5a, and in the fitting joint part 5 inside which the magnet 5b has been attached, as shown in FIG. 2, a fitting concave portion 5c is provided. Accordingly, when the liquid contact part 1 and the valve drive part 2 are fitted and joined to each other, a fitting convex portion 6a of a fitting joint part 6 of the liquid contact part 1 is precisely positioned and fitted to the fitting concave portion 5c of the valve drive part 2. The fitting joint part 6 is formed of a magnetic body, and when it is fitted in the fitting concave portion 5c of the fitting joint part 5 of the valve drive part 2 described above, the magnet 5b is precisely attracted and fitted to the fitting joint part 5. As joint surfaces of the liquid contact part 1 and the valve drive part 2 when they are fitted and joined to each other, as shown in FIG. 10, a joint surface 16a is formed on an upper surface of a diaphragm holding part 16 on the liquid contact part 1 side, and a joint surface 5d is formed on a lower surface of the magnet 5b on the valve drive part 2 side.

Figure 7A:
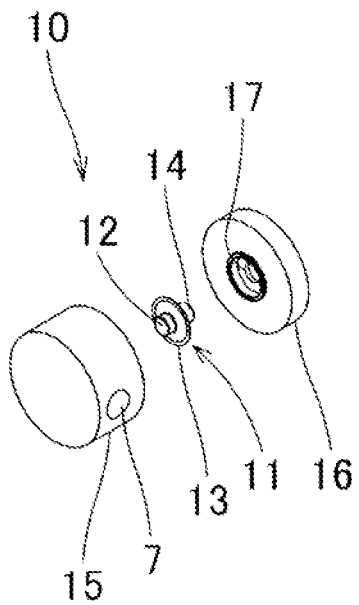
FIG. 7A is an exploded perspective view of the liquid contact part.
Figure 7B:
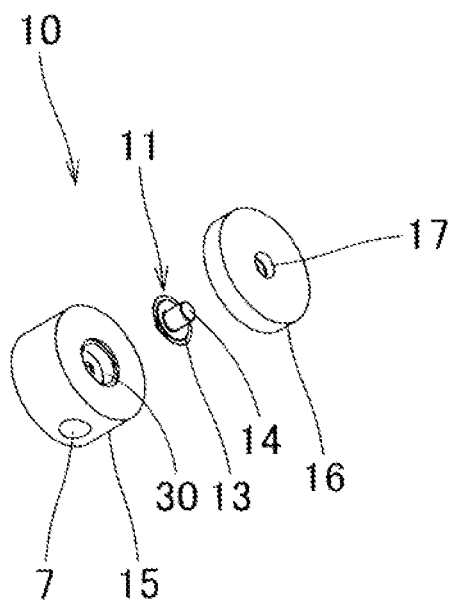
FIG. 7B is an exploded perspective view of the liquid contact part, viewed from an opposite direction.

On the other hand, in the liquid contact part 1, as shown in FIG. 5 and FIG. 7, the valve part 10 including a valve part main body 15, the diaphragm holding part 16, and a diaphragm valve 11 is provided. In the valve part main body 15 of the valve part 10, as shown in FIG. 8, a valve chamber 30 for the diaphragm valve 11 is provided at a central portion. The diaphragm holding part 16 having a stem hole 17 at a central portion is fixed onto the valve part main body 15 so as to align the stem hole 17 and the valve chamber 30. The valve chamber 30 side (lower side in FIG. 8) of the stem hole 17 is formed as a large-diameter hole, and an upper end portion of the stem hole 17 is formed as a medium-diameter hole having a diameter allowing the operation end 23c of the plunger 23 to closely enter. An intermediate portion of the stem hole 17 is formed as a small-diameter hole, and the valve stem 14 of the diaphragm valve 11 is held slidably up and down in the intermediate portion of the stem hole 17.

A rim portion of the diaphragm 13 of the diaphragm valve 11 is closely sandwiched between the diaphragm holding part 16 and the valve part main body 15. The diaphragm 13 itself of the diaphragm valve 11 is provided with valve-opening returnability. That is, as shown in FIG. 10, when the valve drive part 2 and the liquid contact part 1 are separated, and no biasing force is applied to the diaphragm valve 11 and it becomes free, the diaphragm 13 is brought into a flat state, a valving element 12 separates from a valve seat 19 and creates a valve open state.

As shown in FIG. 7, the diaphragm valve 11 is configured so that the valving element 12 is provided at a lower side central portion of the diaphragm 13, and at an upper portion of the valving element 12, the valve stem 14 is provided to project upward. As shown in FIG. 8 and FIG. 9, inside the valve part main body 15, two flow paths 18 communicating with the valve chamber 30 are provided, and each flow path 18 is provided with a connection port 7. At a bottom portion inside the valve chamber 30, the valve seat 19 is provided. When the valving element 12 of the diaphragm valve 11 comes into contact with and is seated on the valve seat 19, a portion between the flow paths 18 and the valve chamber 30 is closed and the valve is closed, and when the valving element 12 separates from the valve seat 19, the valve is opened.

In the valve part 10 of the liquid contact part 1, the diaphragm valve 11 is provided, and at a substantially central portion of the diaphragm valve 11, the valve stem 14 is provided so as to be enabled to project to the valve drive part 2 side (upward). At a central portion of the diaphragm holding part 16, the stem hole 17 through which the valve stem 14 is inserted is formed. The valve stem 14 of the diaphragm valve 11 is inserted and attached into this stem hole 17 from below, and held slidably up and down in the portion of the small-diameter hole provided at the intermediate portion of the stem hole 17.

As shown in FIG. 8, an upper end of the valve stem 14 of the diaphragm valve 11 comes into contact with the operation end 23c being the lower end of the plunger 23, and when the solenoid 21 is not activated, the operation end 23c slightly fits in an upper portion of the stem hole 17 on the liquid contact part 1 side. The valve stem 14 of the diaphragm valve 11 moves up and down by a predetermined stroke via the diaphragm 13 in response to turning-on/off of the solenoid 21 to open/close the valve.

As described above, in the valve device, as shown in FIG. 8 and FIG. 9, the liquid contact part 1 and the valve drive part 2 are joined by fitting and attraction between the diaphragm holding part 16 formed of a magnetic body of the liquid contact part 1 and the magnet 5b of the fitting joint part 5 of the valve drive part 2. When separating these, by operating the liquid contact part 1 and the valve drive part 2 in directions to separate from each other, the diaphragm holding part 16 separates from the magnet 5b, and accordingly, the liquid contact part 1 and the valve drive part 2 can be separated.

In the embodiment described above, the magnet 5b is provided in the fitting joint part 5 in the valve drive part 2, however, it is also possible that the magnet is provided in the fitting joint part 6 on the diaphragm holding part 16 side of the liquid contact part 1, and the fitting joint part 5 is formed of a magnetic body. In this case, the fitting concave portion 5c is provided on the fitting joint part 6 on the liquid contact part 1 side. Alternatively, it is also possible that on the joint surface of the fitting joint part 5 or 6, a shaft-shaped magnet is provided to project, a fitting hole in which the shaft-shaped magnet is fitted is provided in a magnetic body on the opposite side, the shaft-shaped magnet is inserted and positioned in the fitting hole and attracts the magnetic body, and accordingly, the liquid contact part and the valve drive part are joined to each other.

Next, operation of the valve device configured as described above is described. The valve device is used by being fitted to a device that supplies a trace amount of a fluid such as a chemical solution in, for example, a chemical analyzer and medical equipment, etc. To the connection port 7 of the valve device, a supply tube, etc., not shown in the drawings, are connected.

The valve device of the present embodiment is a normally close type, and in a state where energization of the solenoid 21 is turned off, as shown in FIG. 8, the plunger 23 moves down due to a biasing force of the coil spring 24 and pushes the valve stem 14 down, so that the valving element 12 of the diaphragm valve 11 is seated on the valve seat 19 to create a valve closed state. In a case of a normally open type valve device, it is configured so that the valving element 12 separates from the valve seat 19 at a normal time (when not energized) by biasing the plunger 23 upward by the coil spring 24.

When the solenoid 21 is energized, as shown in FIG. 9, the plunger 23 moves up by a predetermined stroke against the biasing force of the coil spring 24, and in response to this, the valving element 12 of the diaphragm valve 11 moves up due to a restoring force of the diaphragm 13 (a force to restore to a free state when the biasing force is removed), and the valving element 12 separates from the valve seat 19 and creates a valve open state.

On the other hand, after use, when the liquid contact part 1 is replaced or cleaned, the liquid contact part 1 is removed and separated from the valve drive part 2. In this case, the diaphragm holding part 16 formed of a magnetic body of the liquid contact part 1 is fitted in the fitting concave portion 5c of the fitting joint part 5 of the valve drive part 2 and attracted and joined to the magnet 5b, so that by moving the liquid contact part 1 away from the valve drive part 2, the fitting joint part 5 and the fitting joint part 6 easily separate from each other, and the liquid contact part 1 and the valve drive part 2 can be separated.

At this time, as shown in FIG. 10, the diaphragm valve 11 of the separated liquid contact part 1 becomes flat due to the restoring force of the diaphragm 13 and moves in a direction to move the valve stem 14 up, and accordingly, the valving element 12 separates from the valve seat 19 and creates a valve open state. Therefore, when cleaning the liquid contact part 1, cleaning water excellently flows from the flow paths 18 into the valve chamber 30, and the interior can be thoroughly and excellently cleaned.

At the time of use, when the liquid contact part 1 and the valve drive part 2 are joined again, by fitting the fitting convex portion 6a of the fitting joint part 6 of the diaphragm holding part 16 into the fitting concave portion 5c of the fitting joint part 5 of the valve drive part 2, the fitting convex portion 6a is attracted to the magnet 5b, and the liquid contact part 1 and the valve drive part 2 can be easily joined. At this time, the operation end 23c of the plunger 23 comes into precise contact with the upper surface of the valve stem 14 of the diaphragm valve 11, and the operation end 23c enters the inside of an upper portion of the stem hole 17, and accordingly, joining at a precise position is realized.

In this way, only by fitting the fitting convex portion 6a of the fitting joint part 6 of the diaphragm holding part 16 into the fitting concave portion 5c of the fitting joint part 5 of the valve drive part 2, the diaphragm holding part 16 formed of a magnetic body of the liquid contact part 1 and the magnet 5b of the fitting joint part 5 of the valve drive part 2 are fitted and attracted to each other and easily joined together, and the operation end 23c of the plunger 23 comes into precise contact with and can be precisely positioned and joined to the upper surface of the valve stem 14 of the diaphragm valve 11.

FIG. 11 to FIG. 14 show a valve device according to another embodiment. In the present embodiment, to a valve stem 44 of a diaphragm valve 41, a spring member 49 that biases the diaphragm valve 41 to a valve opening side is fitted. The same portion as in the embodiment described above in FIG. 11 to FIG. 14 is provided with the same reference signs described above, and description thereof is omitted.

Figure 11A:
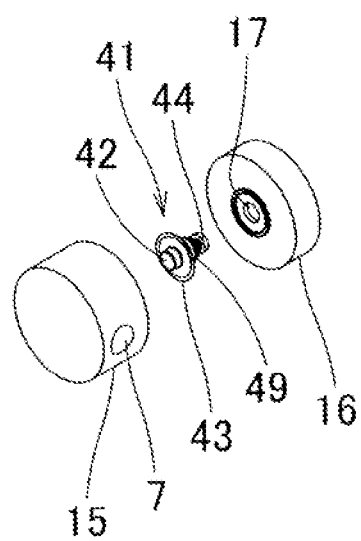
FIG. 11A is an exploded perspective view of a liquid contact part of another embodiment.
Figure 11B:
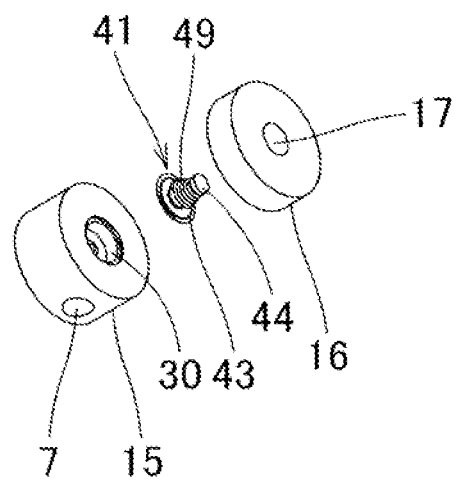
FIG. 11B is an exploded perspective view of the same liquid contact part, viewed from an opposite direction.
Figure 13:
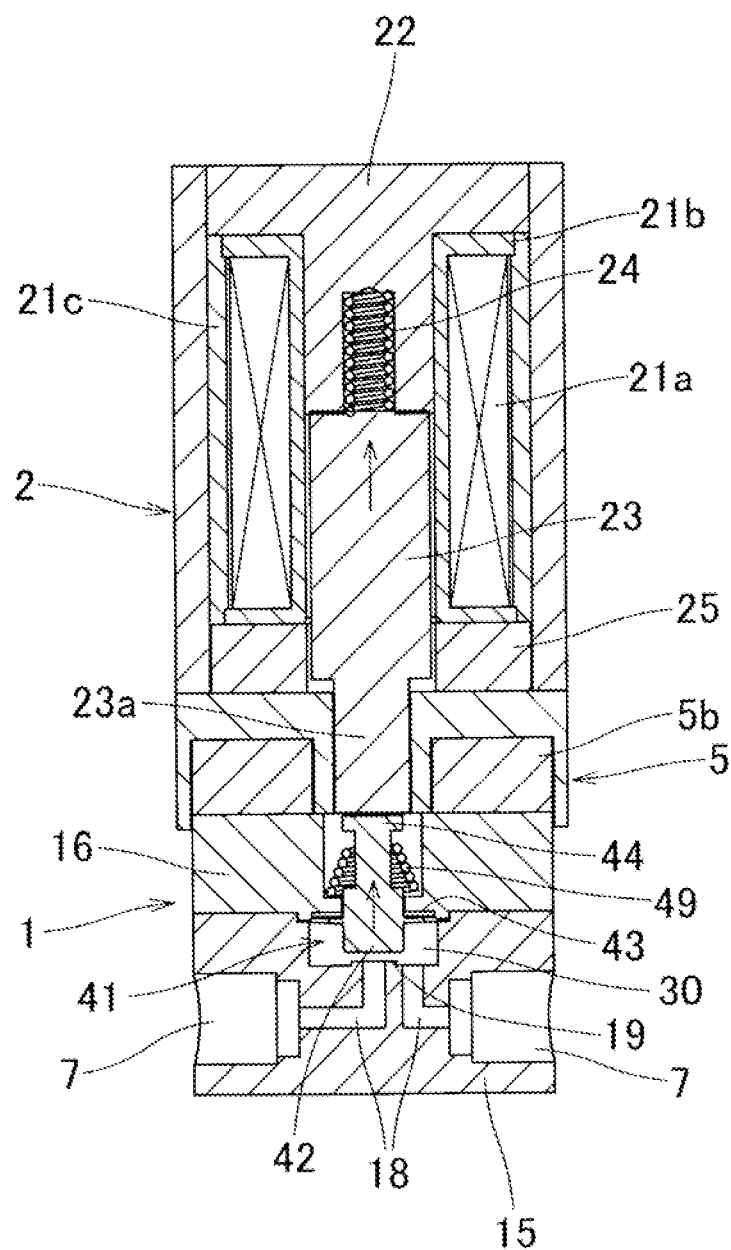
FIG. 13 is a longitudinal sectional view of the valve device of the same embodiment when a solenoid is activated.

The diaphragm valve 41 to be fitted to the liquid contact part 1 is configured so that, as shown in FIG. 11, the spring member 49 having a conical coil spring shape is fitted around the valve stem 44, and in a free state where no biasing force is applied to the valve stem 44, the valve stem 44 moves up and a valving element 42 separates from the valve seat 19 to open the valve. That is, an upper end of the valve stem 44 is formed as a large-diameter portion, and the spring member 49 fitted around the valve stem 44 is fitted between a rim portion of the stem hole of the diaphragm holding part 16 and the large-diameter portion of the valve stem 44. Accordingly, a structure is obtained in which, when the diaphragm valve 41 is brought into a free state, the valve stem 44 is biased upward, and the valving element 42 is opened as shown in FIG. 13. That is, in a valve open state, a diaphragm 43 of the diaphragm valve 41 restores to an initial flat state due to a spring force of the spring member 49.

To create a valve closed state by seating the valving element 42 on the valve seat 19 when the plunger 23 is biased in a valve closing direction by a biasing force of the coil spring 24, the spring force of the spring member 49 is set to be smaller than the spring force of the coil spring 24.

Figure 12:
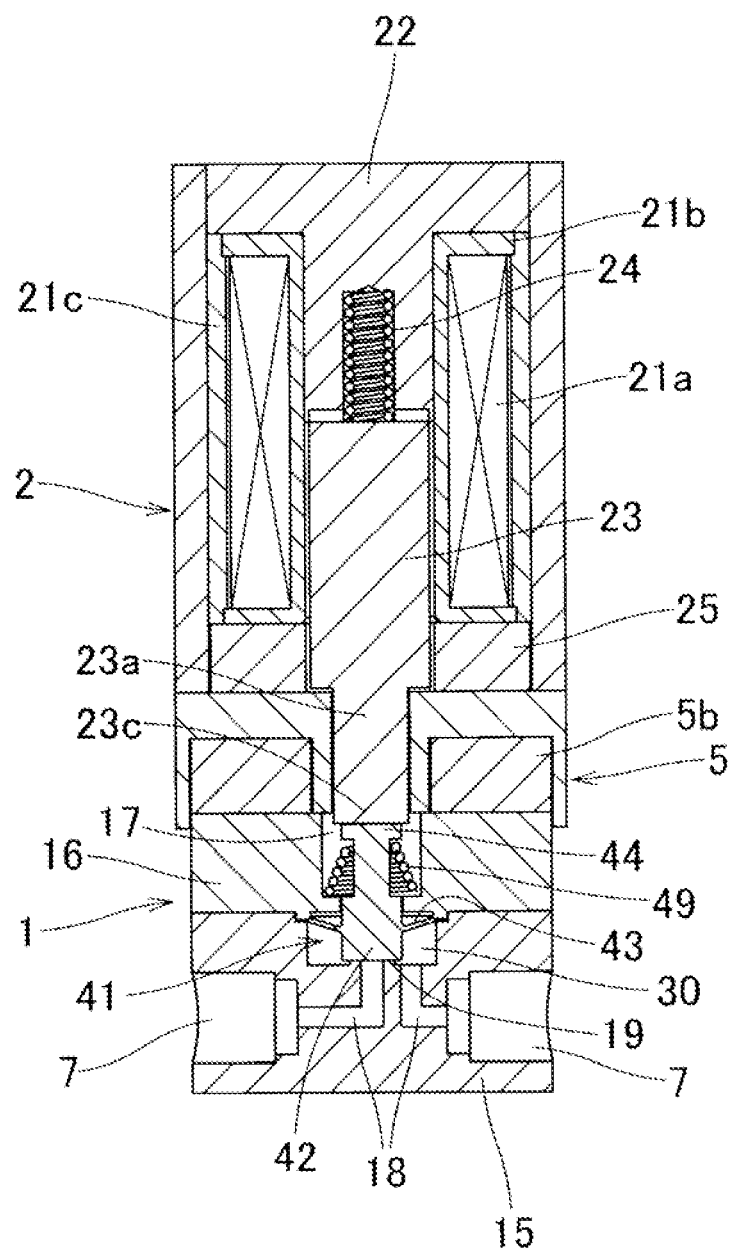
FIG. 12 is a longitudinal sectional view of the valve device of the same embodiment.

This valve device is a normally close type, and in a state where energization of the solenoid 21 is turned off, as shown in FIG. 12, the plunger 23 moves down due to the biasing force of the coil spring 24 and pushes the valve stem 44 down, and the valving element 42 of the diaphragm valve 41 is seated on the valve seat 19 to create a valve closed state. In a case of a normally open type valve device, the valving element 42 is separated from the valve seat 19 at a normal time by biasing the plunger 23 upward by the coil spring 24.

When the solenoid 21 is energized, as shown in FIG. 13, the plunger 23 moves up by a predetermined stroke against the biasing force of the coil spring 24, and in response to this, the valve stem 44 of the diaphragm valve 41 moves up due to the spring force of the spring member 49, and the valving element 42 separates from the valve seat 19 to create a valve open state.

Figure 14:
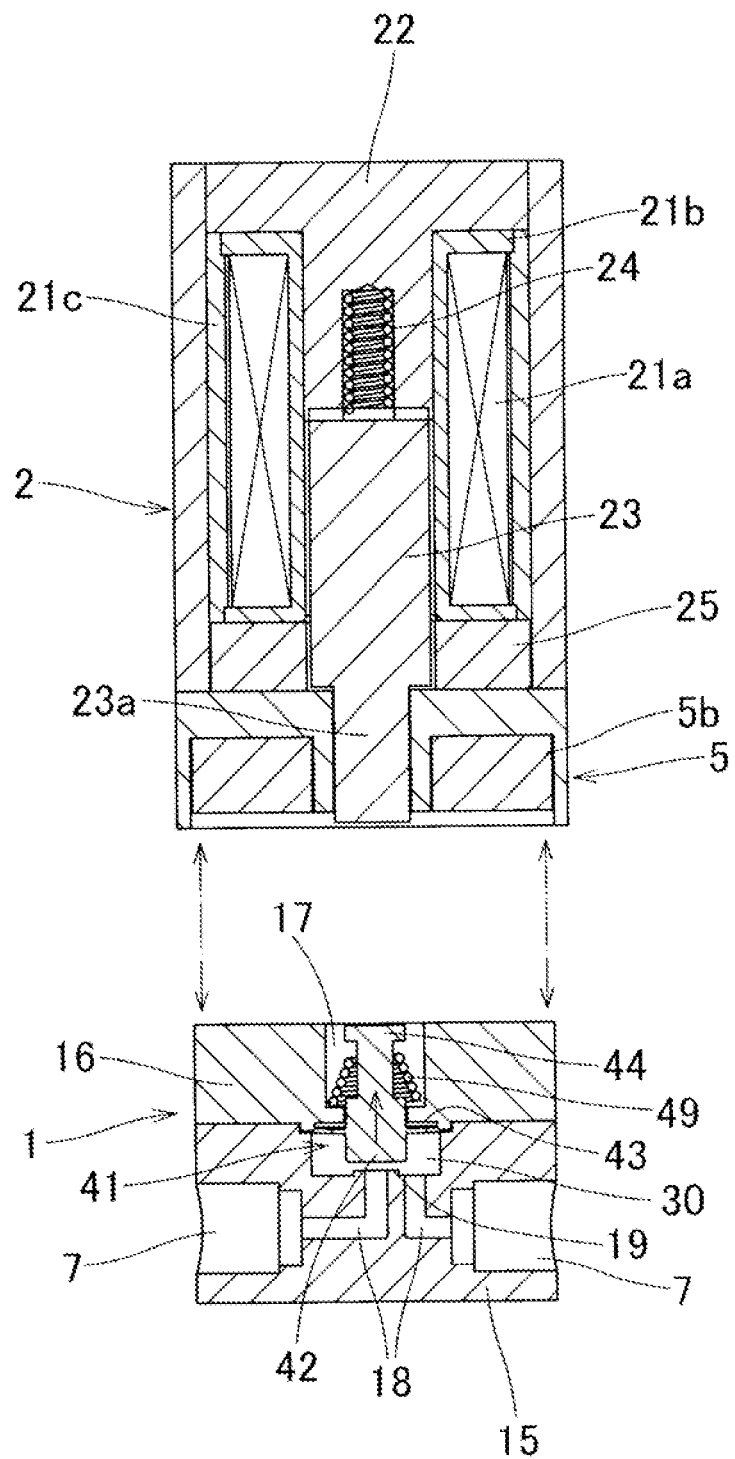
FIG. 14 is a longitudinal sectional view of the same embodiment, showing a state where the liquid contact part is separated.

On the other hand, after use, when the liquid contact part 1 is replaced or cleaned, as shown in FIG. 14, the liquid contact part 1 is separated from the valve drive part 2. In this case, the diaphragm holding part 16 formed of a magnetic body of the liquid contact part 1, that is, the fitting convex portion 6a of the fitting joint part 6 is fitted into the fitting concave portion 5c of the fitting joint part 5 of the valve drive part 2, and attracted and joined to the magnet 5b, so that by moving the liquid contact part 1 away from the valve drive part 2, the liquid contact part 1 and the valve drive part 2 can be easily separated.

At this time, as shown in FIG. 14, concerning the diaphragm valve 41 of the separated liquid contact part 1, the valve stem 44 moves up due to the spring force of the spring member 49 fitted to the valve stem 44, and accordingly, the valving element 42 separates from the valve seat 19 to create a valve open state. Therefore, when cleaning the liquid contact part 1, cleaning water excellently flows from the flow paths 18 to the valve chamber 30 and the interior can be thoroughly cleaned.

What is claimed is:

1. A valve device comprising:
    a liquid contact part provided with a flow path to distribute a liquid;
    a valve part provided in the liquid contact part and configured to open and close the flow path;
    a valve drive part removably joined to the liquid contact part and configured to drive the valve part to open/close;
    a diaphragm valve provided in the valve part;
    a valve stern provided to project from a substantially central portion of the diaphragm valve; and
    a stem hole which is provided in the liquid contact part so as to open in a joint surface between the liquid contact part and the valve drive part, and through which the valve stem is inserted,
    wherein on Joint surfaces between the liquid contact part and the valve drive part, fitting joint parts by which the liquid contact part and the valve drive part are positioned and removably fitted and joined, and
    wherein the fitting joint parts by which the liquid contact part and the valve drive part are fitted and joined to each other are provided with a fitting concave portion and a fitting convex portion to be fitted in the fitting concave portion, and at the time of fitting, the fitting concave portion and the fitting convex portion are attracted to each other by a magnet.

2. The valve device according to claim 1, wherein the magnet is provided inside the fitting joint part of the valve drive part, the fitting joint part of the liquid contact part is formed of a magnetic body, the fitting convex portion is formed on the fitting joint part of the liquid contact part, and the fitting concave portion is formed on the fitting joint part of the valve drive part.

3. A valve device comprising:
    a liquid contact part provided with a flow path to distribute a liquid;
    a valve part provided in the liquid contact part and configured to open and close the flow path;
    a valve drive part removably joined to the liquid contact part and configured to drive the valve part to open/close;
    a diaphragm valve provided in the valve part;
    a valve stern provided to project from a substantially central portion of the diaphragm valve; and
    a stem hole which is provided in the liquid contact part so as to open in a joint surface between the liquid contact part and the valve drive part, and through which the valve stem is inserted,
    wherein on joint surfaces between the liquid contact part and the valve drive part, fitting joint parts by which the liquid contact part and the valve drive part are positioned and removably fitted and joined,
    wherein the valve drive part is provided with a solenoid and a plunger configured to slide in the solenoid when activated, and an operation end provided on a tip end of the plunger come into contact with an end portion of the valve stem and can enter the stern hole,
    wherein when the valve drive part is not activated, the diaphragm valve is closed by a biasing force of a spring provided on the plunger, and
    wherein a diaphragm of the diaphragm valve has valve-opening returnability to open the valve in a free state where no biasing force is applied to the diaphragm, and the diaphragm valve is brought into a valve open state while the valve drive part is removed from the liquid contact part.

4. A valve device comprising:
a liquid contact part provided with a flow path to distribute a liquid;
a valve part provided in the liquid contact part and configured to open and close the flow path;
a valve drive part removably joined to the liquid contact part and configured to drive the valve part to open/close;
a diaphragm valve provided in the valve part;
a valve stem provided to project from a substantially central portion of the diaphragm valve; and
a stem hole which is provided in the liquid contact part so as to open in a joint surface between the liquid contact part and the valve drive part, and through which the valve stem is inserted,
wherein on joint surfaces between the liquid contact part and the valve drive part, fitting joint parts by which the liquid contact part and the valve drive part are positioned and removably fitted and joined,
wherein the valve drive part is provided with a solenoid and a plunger configured to slide in the solenoid when activated, and an operation end provided on a tip end of the plunger come into contact with an end portion of the valve stem and can enter the stem hole,
wherein when the valve drive part is not activated, the diaphragm valve is closed by a biasing force of a spring provided on the plunger, and
wherein the diaphragm valve is provided with a spring member to bias the diaphragm valve to a valve opening side.

5. A valve device comprising:
a liquid contact part provided with a flow path to distribute a liquid;
a valve part provided in the liquid contact part and configured to open and close the flow path;
a valve drive part removably joined to the liquid contact part and configured to drive the valve part to open/close;
a diaphragm valve provided in the valve part;
a valve stem provided to project from a substantially central portion of the diaphragm valve; and
a stem hole which is provided in the liquid contact part so as to open in a joint surface between the liquid contact part and the valve drive part, and through which the valve stem is inserted,
wherein on joint surfaces between the liquid contact part and the valve drive part, fitting joint parts by which the liquid contact part and the valve drive part are positioned and removably fitted and joined,
wherein the valve drive part is provided with a solenoid and a plunger configured to slide in the solenoid when activated, and an operation end provided on a tip end of the plunger come into contact with an end portion of the valve stem and can enter the stem hole,
wherein when the valve drive part is not activated, the diaphragm valve is opened by a biasing force of a spring provided on the plunger, and
wherein a diaphragm of the diaphragm valve has valve-opening returnability to open the valve in a free state where no biasing force is applied to the diaphragm, and the diaphragm valve is brought into a valve open state while the valve drive part is removed from the liquid contact part.

6. A valve device comprising:
a liquid contact part provided with a flow path to distribute a liquid;
a valve part provided in the liquid contact part and configured to open and close the flow path;
a valve drive part removably joined to the liquid contact part and configured to drive the valve part to open/close;
a diaphragm valve provided in the valve part;
a valve stem provided to project from a substantially central portion of the diaphragm valve; and
a stern hole which is provided in the liquid contact part so as to open in a joint surface between the liquid contact part and the valve drive part, and through which the valve stein is inserted,
wherein on joint surfaces between the liquid contact part and the valve drive part, fitting joint parts by which the liquid contact part and the valve drive part are positioned and removably fitted and joined,
wherein the valve drive part is provided with a solenoid and a plunger configured to slide in the solenoid when activated, and an operation end provided on a tip end of the plunger come into contact with an end portion of the valve stem and can enter the stem hole,
wherein when the valve drive part is not activated, the diaphragm valve is opened by a biasing force of a spring provided on the plunger, and
wherein the diaphragm valve is provided with a spring member to bias the diaphragm valve to a valve opening side.

* * * * *